(12) United States Patent
Aihara

(10) Patent No.: US 7,567,402 B2
(45) Date of Patent: Jul. 28, 2009

(54) STORAGE DEVICE, CONTROL METHOD THEREOF AND PROGRAM

(75) Inventor: Masami Aihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 484 days.

(21) Appl. No.: 11/325,669

(22) Filed: Jan. 4, 2006

(65) Prior Publication Data

US 2007/0130391 A1 Jun. 7, 2007

(30) Foreign Application Priority Data

Oct. 28, 2005 (JP) ............................. 2005-314552

(51) Int. Cl.
*G11B 21/02* (2006.01)
(52) U.S. Cl. ............................. 360/75; 710/18; 710/19; 710/32; 360/5; 360/6; 360/45
(58) Field of Classification Search ................... 710/74, 710/263, 266, 18, 19, 32; 360/5, 6, 45, 75
See application file for complete search history.

(56) References Cited

U.S. PATENT DOCUMENTS

2003/0163639 A1* 8/2003 Baum et al. ................. 711/113

2006/0072236 A1* 4/2006 Ito et al. ....................... 360/75

FOREIGN PATENT DOCUMENTS

JP 2004-146036 5/2004
JP 2004-171608 6/2004

\* cited by examiner

*Primary Examiner*—Tariq Hafiz
*Assistant Examiner*—Jasjit S Vidwan
(74) *Attorney, Agent, or Firm*—Greer, Burns & Crain, Ltd.

(57) ABSTRACT

The storage device of the invention has a ramp mechanism which shakes out the head onto the disk medium, and causes the head to evacuate from the medium to hold it. The command queuing processing unit stores input/output commands into the command queue in the order of issuance by the host, and then, executes the commands in arrangement in the increasing order of the medium access time. Completion of commands is responded to the host in the order of completion of execution. The end of command is responded to the host in the order of end of execution. The emergency evacuation processing unit interrupts, upon receipt of an emergency evacuation command from the host during operation of the command queuing processing unit, operation of the command queuing processing unit and protects the head by causing the head to evacuate from the medium to the ramp mechanism.

9 Claims, 8 Drawing Sheets

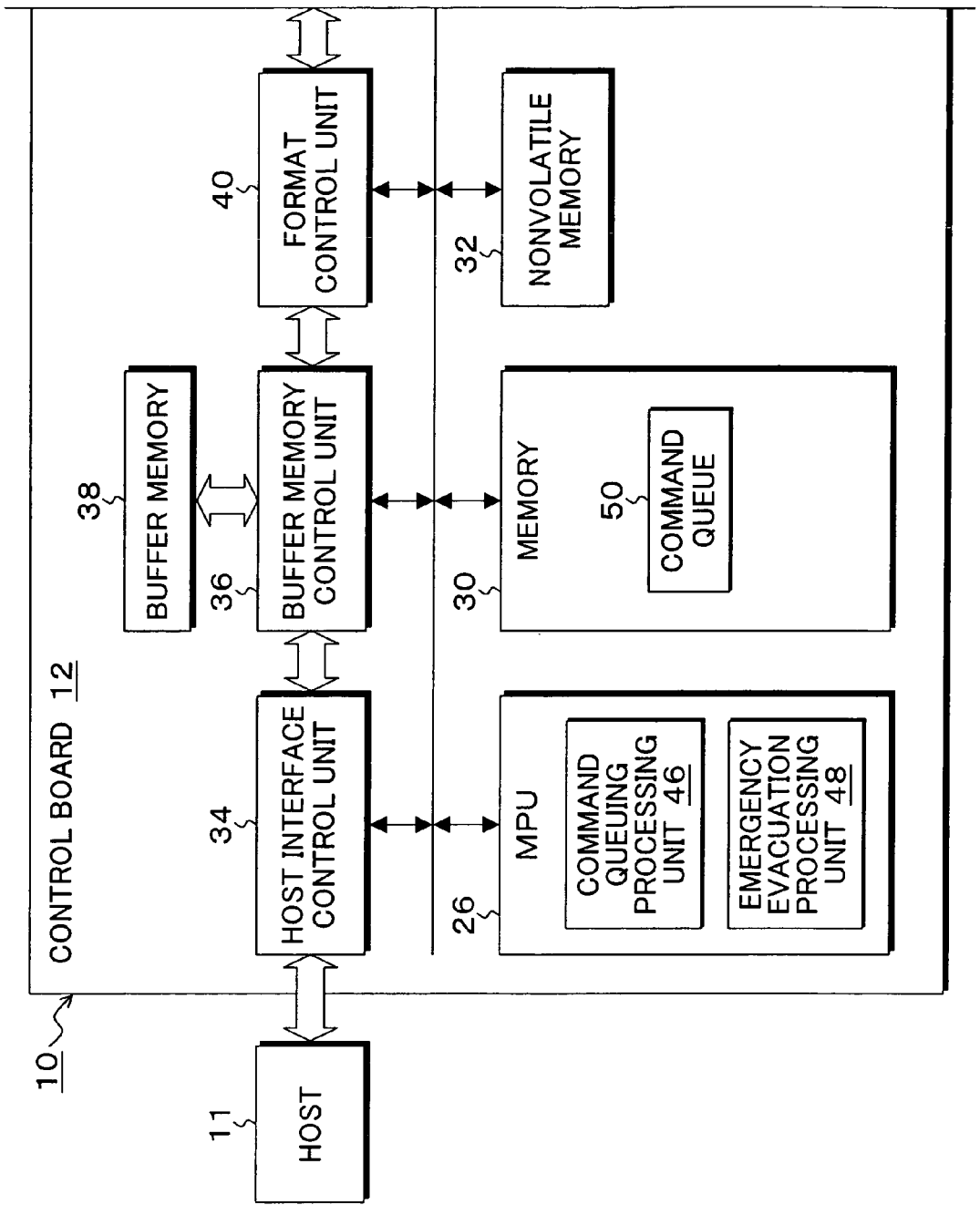

STORAGE DEVICE, CONTROL METHOD THEREOF AND PROGRAM

This application is a priority based on prior application No. JP2005-314552, filed Oct. 28, 2005, in Japan.

BACKGROUND OF THE INVENTION

1. Field of the Invention

The present invention relates to a storage device which, upon receipt of an emergency evacuation command based on an impact prediction or the like, causes a head to evacuate from a medium, a control method thereof and a program. More particularly, the invention relates to a storage device, a control method thereof and a program for causing a head to evacuate by an emergency evacuation command during execution of a queued input/output command.

2. Description of the Related Art

In a storage device such as a magnetic disk apparatus, it is the conventional practice to provide a ramp mechanism which holds the head by causing the head to evacuate from the medium in stoppage of the device, to perform a loading processing to shake out the head from the ramp mechanism onto the medium when rotation of the medium caused by activation of the device reaches a certain number of revolutions, and to conduct an unloading processing in which the head is caused to evacuate from the medium into the ramp mechanism upon stoppage of the device. A high-speed serial transfer interface such as a serial ATA (ANSI T13/Serial ATA International Organization (SATA-IO)) is used in a more recent storage device as an interface with the host. In such an interface, a command queuing function which executes an input/output command (a write command or a read command) issued by a host through queuing (called "Native Command Queuing" in serial ATA) is provided to reduce the processing time (overhead) of the upper device and the magnetic disk apparatus. The command queuing function provided by a high-speed serial transfer interface comprises the steps of storing input/output commands from the host into a queue of the magnetic disk apparatus in the order of command issuance (out-order), performing a reordering of arranging the commands in the increasing order of access time on the device side, taking out the commands in the order of arrangement and sequentially executing them, and upon the completion of command execution, notifying the host of the end status in the order of command completion. That is, the command queuing function queues input/output commands from the host "in-order" (order of issuance), then conducts a reorder of arranging the commands in the increasing order of medium access time to execute the commands "out-order", and upon the completion of command execution, responds the command completion as they are in the "out-order" state. Even in a magnetic disk apparatus using a parallel transfer interface in use prior to the recent general use of the high-speed serial transfer interface, this command queuing function of input/output commands in a storage device is now industrially applied, not as an interface, but as a function on the device side. However, the command queuing function provided as a function on the device side in the conventional art is the same as above in that input/output commands from the host are queued in the sequence of issuance and arranged in the increasing order of access time for execution. For the end response to the host upon the completion of command execution, however, the command end is responded in the order of command issuance since the host is not conscious of the command queuing function on the device side. In other words, in the conventional command queuing function working only on the device side, input/output commands from the host are queued "in-order" (in the command issuing order), then, reordering is carried out in the increasing order of medium access time in arrangement to execute the commands "out-order", and upon the completion of command execution, the end of commands is reported to the host "in-order" (in the order of command issuance). Even when the command queuing function is provided on the device side, therefore, the command end response to the host is conducted in the order of command issuance before reordering. Even if command execution is completed on the device side, the command end response must wait for the completion of response of execution completion of all preceding commands issued by the host. Provision of the command queuing function on the device side brings about no difference in the processing time as viewed from the host from the case of absence of the command queuing function, leading to a problem in that the provision makes no contribution to the reduction of the processing time between the host and the device. The above-mentioned problem is solved by the command queuing function provided by the high-speed serial transfer interface. Upon completion of command execution "out-order" by reordering on the device side, a command end response can be immediately given to the host while holding the "out-order" state, thus enabling to directly reflect the reduction of the processing time achieved by reordering on the device side in the reduction of the processing time between the host and the device. Furthermore, in the control procedure of command queuing in the conventional high-speed serial transfer interface, i.e., in the command queuing protocol, when the host issues an input/output command to be queued, the storage device keeps its queuing state until the command ends normally or in error and the command end is reported to the host in response "out-order". To maintain this protocol, the host is prohibited from issuing any command other than the input/output commands to be queued in the command queuing state by the protocol. On the other hand, in a recent portable information processing device such as a lap-top type personal computer, for the purpose of preventing breakage of the storage device caused by a falling impact of the device, a protection control is proposed in which a sensor detecting an inclination or vibration is provided on the host side. Falling is predicted from a sensor detection signal and an emergency evacuation command is issued to the storage device, thus causing the head to emergency-evacuate from the medium to the ramp mechanism before suffering from the impact (see Nos. JP2004-171608 and 2004-146036). However, when the host and the storage device are connected via a high-speed serial transfer interface providing the command queuing function, if command queuing is in a non-activated state in which an input/output command is not stored in the queue on the device side, it is possible to cause the head to evacuate from the medium into the ramp mechanism by executing an emergency evacuation command from the host. However, when the host issues an emergency evacuation command in the activated state of command queuing, the storage device interprets it as a protocol error since the storage device is generally worked out into a commercial product in accordance with the rules of command queuing protocol between a host and a device. There is therefore a problem in that the storage device only reports the error and does not execute the emergency evacuation command, and the head cannot emergency-evacuate from the medium into the ramp mechanism.

SUMMARY OF THE INVENTION

According to the present invention, there are provided a storage device, a control method and a program making appropriately executable an emergency evacuation command issued by a host by the storage device even in an activated state of command queuing. The present invention provides a storage device. The storage device of the invention has a ramp mechanism which shakes out a head onto a medium and holds the head by causing the head to evacuate from the medium, comprising:

a command queuing processing unit which, after storing input/output commands in the order of command issuance by a host into a queue, executes the commands by arranging the commands in the increasing order of access time to the medium, and responds to the host with the command completion in the order of completion of execution; and an emergency evacuation processing unit which, upon receipt of an emergency evacuation command from the host during operation of the command queuing processing unit, discontinues operation of the command queuing processing unit, and causes the head to evacuate from the medium into the ramp mechanism.

In the above-mentioned storage device, the emergency evacuation processing unit holds, upon discontinuing command execution of the command queuing processing unit, the discontinuance state, and upon the completion of execution of the emergency evacuation command, resumes command execution by canceling the discontinuance state of command execution of the command queuing processing command. The emergency evacuation processing unit notifies, upon the completion of execution of the emergency evacuation command, the host of normal end of the command. The emergency evacuation processing unit may cancel, upon the completion of execution of the emergency evacuation command, all the command information queued in the command queuing processing unit. In this case, the emergency evacuation processing unit notifies, upon the completion of execution of the emergency evacuation command, the host of the occurrence of a protocol error of queuing in the command queuing processing unit.

The present invention provides a control method of a storage device having a ramp mechanism which shakes out a head onto a medium and holds the head by causing the head to evacuate from the medium, comprising:

a command queuing processing step which, after storing input/output commands in the order of command issuance by a host into a queue, executes the commands by arranging the commands in the increasing order of access time to the medium, and responds to the host with the command completion in the order of completion of execution; and an emergency evacuation processing step which, upon receipt of an emergency evacuation command from the host during operation of the command queuing processing unit, discontinues operation of the command queuing processing unit, and causes the head to evacuate from the medium into the ramp mechanism.

The present invention provides a program executed by a computer of a storage device. More specifically, the program of the present invention causes a computer of a storage device having a ramp mechanism which shakes out a head onto a medium and holds the head by causing the head to evacuate from the medium to execute:

a command queuing processing step which, after storing input/output commands in the order of command issuance by a host into a queue, executes the commands by arranging the commands in the increasing order of access time to the medium, and responds to the host the command completion in the order of completion of execution; and an emergency evacuation processing step which, upon receipt of an emergency evacuation command from the host during operation of the command queuing processing unit, discontinues operation of the command queuing processing unit, and causes the head to evacuate from the medium into the ramp mechanism.

According to the present invention, even in a state in which commands are queued in the storage device, when a command causing the head to emergency-evacuate is received from the host, it is possible to make the command acceptable for execution, not in accordance with the rules of command queuing protocol, without treating it as a protocol error of command queuing, cause the head to evacuate from the medium into the ramp mechanism, and thus protect the head from an impact. It is also possible to protect the head by executing the emergency evacuation command even in command queuing, without exerting an effect on the command queuing protocol by temporarily discontinuing command queuing upon receipt of the emergency evacuation command, and resuming it upon the completion of the emergency evacuation command. Similarly, the head can be protected through execution of the emergency evacuation command even during command queuing by executing the emergency evacuation command by temporarily discontinuing command queuing upon receipt of the emergency evacuation command, canceling all the command queuing information upon the completion of execution, and causing retry by notifying a protocol error. It is furthermore possible to accomplish processing regardless of the kind of command covered by queuing and protect the head through execution of the emergency evacuation command during command queuing, without changing the command system of command queuing.

The above and other objects, features, and advantages of the present invention will become more apparent from the following detailed description with reference to the drawings.

BRIEF DESCRIPTION OF THE DRAWINGS

FIGS. 1A and 1B are block diagrams of the magnetic disk apparatus showing an embodiment of the storage device according to the present invention;

DETAILED DESCRIPTION OF THE PREFERRED EMBODIMENTS

Figure 1B:
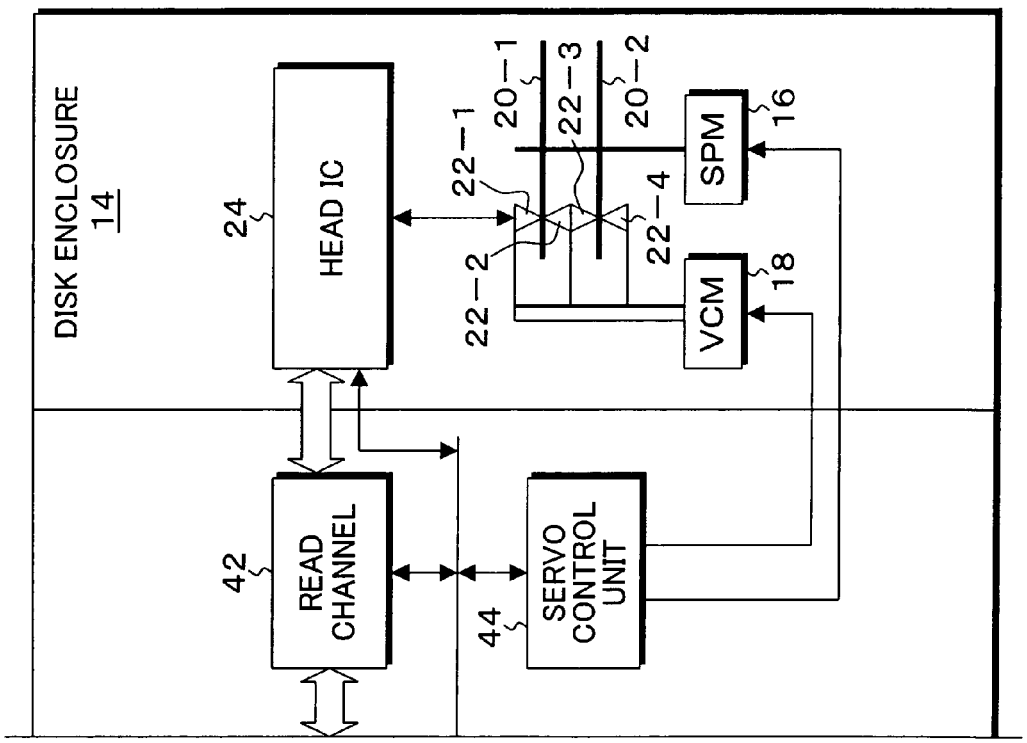

FIGS. 1A and 1B are block diagrams of a magnetic disk apparatus as an embodiment of the storage device of the present invention. In FIGS. 1A and 1B, a magnetic disk apparatus 10 known as a hard disk drive (HDD) is constituted of a disk enclosure 14 and a control board 12. The disk enclosure 14 is provided with a spindle motor 16, and disk media (storage media) 20-1 and 20-2 is mounted on a rotation shaft of the spindle motor 16 and is rotated at certain revolutions. The disk enclosure 14 is provided with a voice coil motor 18, and the voice coil motor 18 mounts heads 22-1 to 22-4 on a tip of an arm of a head actuator to position the head relative to a recording face of the disk medium 20. A write head and a read head are integrally mounted on the heads 22-1 to 22-4. The heads 22-1 to 22-4 are connected to a head IC 24 through a signal line, and the head IC 24 selects one head by a head select signal based on a write command or read command from a host as a higher-level apparatus to perform writing or reading. Further, the head IC 24 is provided with a write amplifier for write system and a preamplifier for read system. The control board 12 is provided with an MPU 26, and a bus 28 of the MPU 26 is provided with a memory 30 for storing therein a control program and control data using a RAMP and a nonvolatile memory 32 for storing therein a control program using a FROM or the like. The bus 28 of the MPU 26 is provided with a host interface control unit 34, a buffer memory control unit 36 for controlling the buffer memory 38, a format control unit 40 functioning as a hard disk controller, a read channel 42 functioning as a write modulating unit, and a servo control unit 44 for controlling the voice coil motor 18 and the spindle motor 16. The magnetic disk apparatus 10 executes input/output command processing based on the command queuing function provided as serial ATA's Native Command Queuing or the like by receiving a write command or a read command as an input/output command from the host 11, and adopting a high-speed serial transfer interface such as serial ATA for the connection between the host and the host-interface control unit 34. For the purpose of achieving the command queuing function provided by the high-speed serial transfer interface, a command queuing processing unit 46 is provided in the MPU 26, and in correspondence thereto, a command queue 50 is arranged in the memory 30. The command queuing processing unit 46 carries out reordering in which input/output commands issued by the host 11 such as write commands and read commands are stored in the command issuing order into the command queue 50 and are arranged in the increasing order of medium access time, takes out and executes commands having the shortest medium access time, and upon the completion of execution, the end of command is immediately responded to the host 11. In other words, after storing input/output commands from the host 11 into the command queue 50 in the command issuance order, i.e., "in-order", reordering is performed by arranging the commands in the increasing order of the medium access time. After arrangement, "out-order" execution is carried out by taking out the commands in the increasing order of access time. Further, upon the completion of command by medium access, the end status can be responded immediately to the host 11. The following formula is used for expressing the access time when arranging input/output commands stored in the command queue 50:

(Access time)=(seeking time)+(rotation waiting time).

The seeking time is a time required for positioning the head in a desired track on the disk medium after taking out the input/output commands from the command queue 50. The rotation waiting time is a time required for a desired sector to read the head position by rotation of the disk medium after positioning the head in the desired track. For the command queuing processing unit 46 of the present invention, as described above, the input/output commands issued by the host 11 are stored in the command queue 50 and are arranged in the increasing order of access time. Then, "out-order" execution is carried out by taking out the commands in the increasing order of access time. Further, immediately upon the completion of an executed command, command end can be reported to the host 11. As compared with a case where the command completion response has been made in the order of command issuance, therefore, it is possible to largely reduce the overhead between the host 11 and the magnetic disk apparatus 10. Furthermore, an emergency evacuation processing unit 48 is provided in the MPU 26. Upon receipt of an emergency evacuation command from the host 11, the emergency evacuation processing unit 48 executes an emergency evacuation processing for causing the head to evacuate from the disk medium surface into the ramp mechanism. In an emergency evacuation processing, the emergency evacuation command from the host 11 may be directly executed as it is and an end response may be given in cases other than the command queuing state by the command queuing processing 46. When the emergency evacuation command is received from the host 11 in the command queuing state, in contrast, the command queuing processing unit 46 determines commands other than the input/output commands in the command queuing state as a protocol error, and it is possible to execute the emergency evacuation command issued by the host 11 in the command queuing state as it is. Upon receipt of an emergency evacuation command from the host 11 in the command queuing state with the command queuing processing unit 46 in operation, the emergency evacuation processing unit 48 of the invention carries out an emergency evacuation processing by temporarily discontinuing operation of the command queuing processing unit 46, executing the emergency evacuation command received during this interruption of operation, and causing the head to evacuate from the medium into the ramp mechanism. Processing after execution of the emergency evacuation command may be accomplished relative to the command queuing processing unit 46 temporarily interrupted for the execution of the emergency evacuation command in any of the following two ways:

(1) Upon interrupting operation of the command queuing processing unit 46, keeping the interruption state, and after the completion of execution of the emergency evacuation command, resuming command queuing by canceling the interruption state of command execution of the command queuing processing unit 46; and (2) After the completion of operation of the emergency evacuation command, canceling all the command information queued in the command queuing processing unit 46.

In the control of the command queuing processing unit 46 after the completion of execution of the emergency evacuation command, the command normal end of the emergency evacuation command is notified as a response resulting from the end of execution of the emergency evacuation command to the host 11 for resuming command queuing after interruption (1). On the other hand, when totally canceling the information queued upon the completion of execution of the emergency evacuation command (2), an error status showing occurrence of a protocol error in command queuing is prepared and reported simultaneously with the report of execution of the emergency evacuation command. At the end of execution of the emergency evacuation command, the command queuing processing unit 46 selects and performs any of (1) resuming to continue processing, and (2) canceling command queuing in response to usage of the host 11 and the storage device 10. When canceling all the information of command queuing upon completion of the emergency evacuation command, retry must be conducted from the host 11 for the canceled input/output commands to be covered by queuing, and this requires so much time. In order to improve the access performance, therefore, it is desirable to conduct processing of keeping the interruption state by interrupting the command queuing operation during execution of the emergency evacuation command of (1) above, and to resume the command queuing operation so far interrupted upon completion of execution of the emergency evacuation command. In order to improve the data reliability from the storage device 10, on the other hand, it is desirable to determine a protocol error along with execution of the emergency evacuation command as in (2), cancel all the queuing information, and cause retry by means of a notice by the host 11 of the protocol error. Information of interrupted queuing includes, for example, the queued tag number and information about command corresponding thereto. Further, the command queue 50 stores, in addition to the commands themselves, information about in what portion of the cache region temporarily the data sent/to be sent from the host 11 is to be stored, in what portion on the medium the data sent/to be sent from the host 11 is to be stored, and whether the data is to be written or read.

Figure 2:
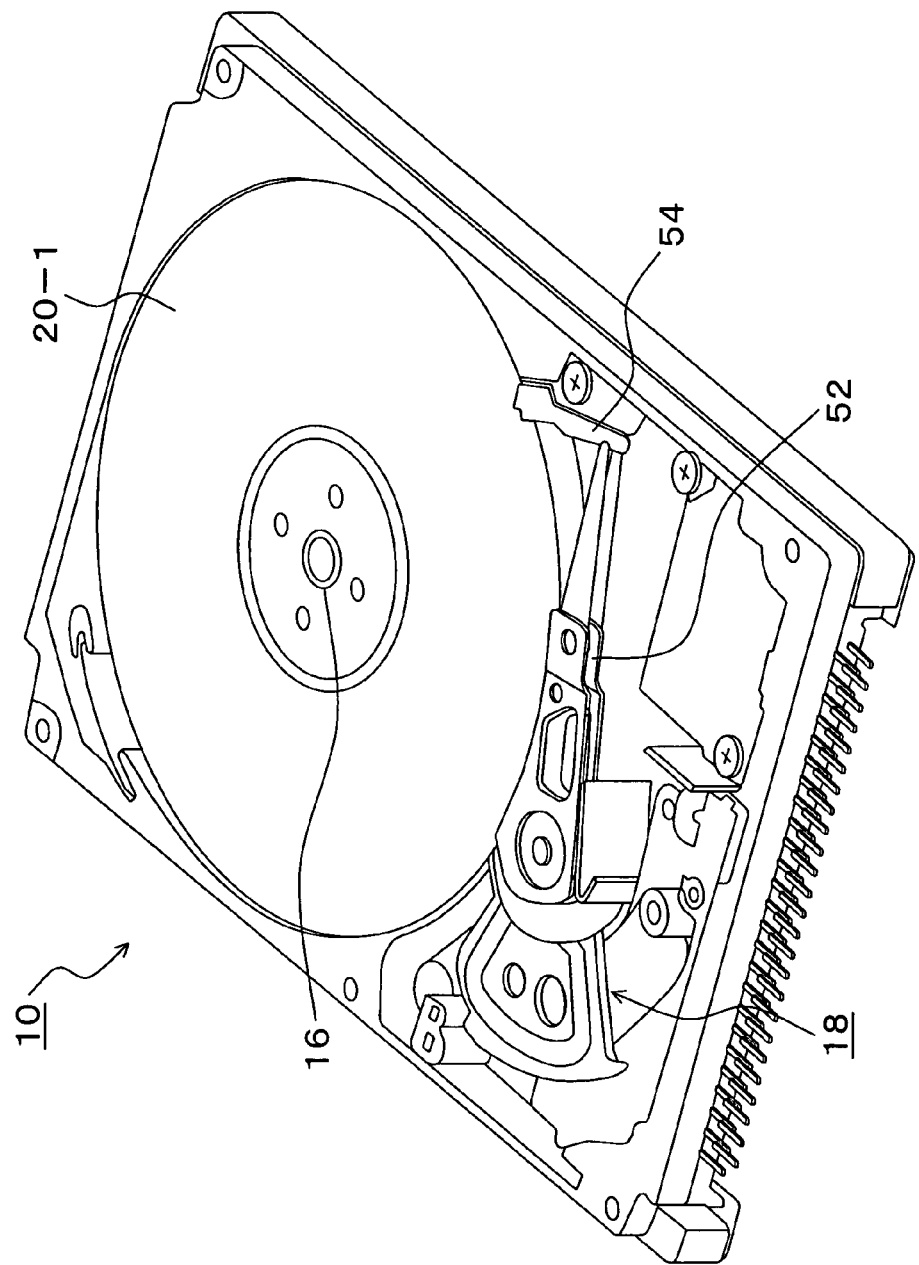
FIG. 2 is a descriptive view of a ramp mechanism of the magnetic disk apparatus shown in FIGS. 1A and 1B.

FIG. 2 illustrates the internal structure of the disk enclosure 14 in the magnetic disk apparatus 10 shown in FIG. 1. In FIG. 2, disk media 20-1 and 20-2 rotated by the spindle motor 16 are incorporated in the magnetic disk apparatus 10. A head actuator 52 driven by the voice coil motor 18 is provided relative to the disk media 20-1 and 20-2, and the leading end of the head actuator 52 has the head.

The head actuator 52 is at an evacuated position in the shown state. In this state, the head portion at the leading end of the head actuator 52 is evacuated on a ramp mechanism 54 arranged toward the shading-out direction of the head relative to the disk media 20-1 and 20-2. When the magnetic disk apparatus is turned on, the disk media 20-1 and 20-2 are rotated by the spindle motor 16, and when the number of revolutions reaches a certain level, the head actuator 52 is turned by the voice coil motor 18 toward the side of the disk media 20-1 and 20-2, and shakes out the head from the ramp mechanism 54 onto the disk media 20-2 and 20-2. When the emergency evacuation command which will be described later is received in a state in which the head is seeking a target track by means of a command from the host 11 by positioning the head on the disk media 20-1 and 20-2, an emergency evacuation operation is carried out by causing the head to evacuate into the ramp mechanism 54 and holding it.

Figure 3A:
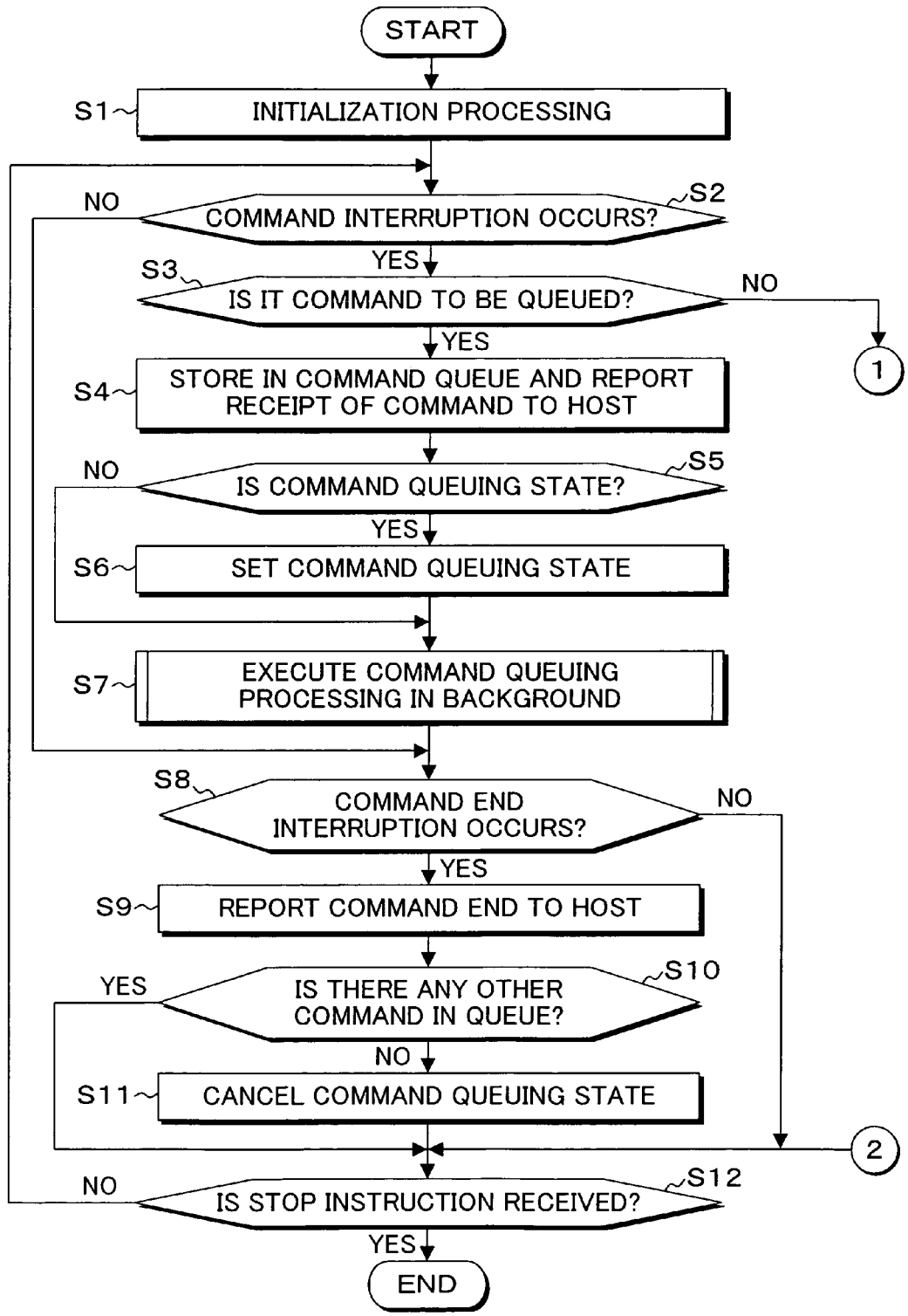
FIG. 3 is a flowchart of control processing in the embodiment shown in FIGS. 1A and 1B.
Figure 3B:
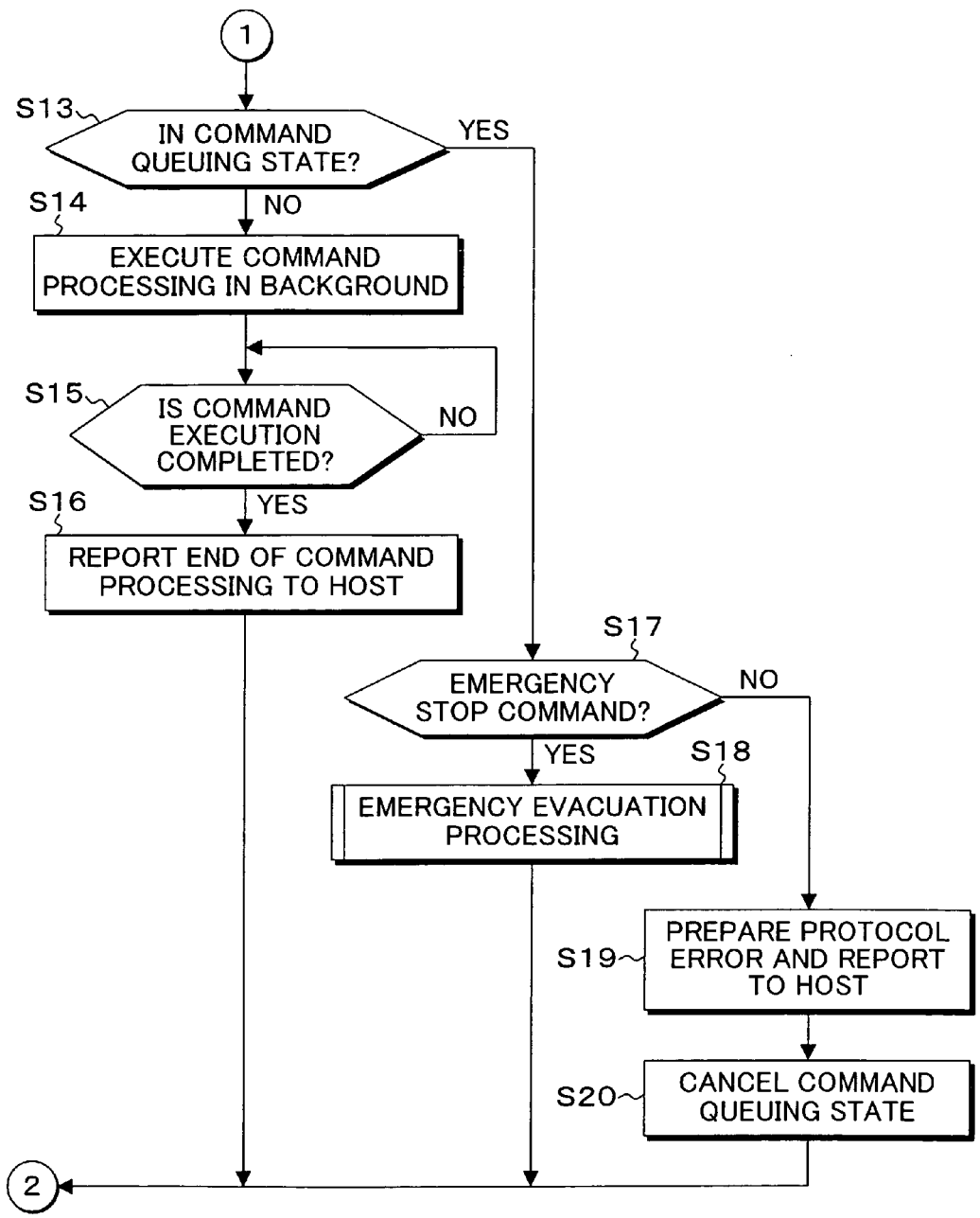

FIG. 3 is a flowchart of the control processing in the embodiment shown in FIGS. 1A and 1B. In FIG. 3, when the host 11 and the storage device 10 are turned on in conjunction, an initialization processing is carried out in step S1, and in step S2, a standby state is brought about owing to occurrence of command interruption resulting from command issuance from the host 11. When the command issued by the host 11 is received, leading to occurrence of command interruption in step S2, the process advances to step S3, in which it is determined whether or not the command issued by the host 11 is one to be covered by queuing, i.e., for example, whether it is a write command or a read command. If it is a command to be queued, the write command or the read command is stored in the command queue 50 in step S4, and the receipt of the command is reported to the host 11. Then in step S5, it is determined whether or not the state is in command queuing. That is, if the command to be queued has already been received and is in storage in the command queue 50, the process skips step S6 since this means the command queuing state. If the command queue 50 is vacant, the process advances to step S6 upon storage of the command into the command queue 50, and the command queuing state is set. Then in step S7, the command queuing processing is executed in the background. The command queuing processing is executed in the background by separately preparing a program module by command queuing processing. Then in step S8, presence or absence of command end interruption is determined. Upon occurrence of command end interruption, a command end status is prepared and reported to the host 11 in step S9, and then in step S10, it is determined whether or not another command queued in the command queue 50 is existent. If not existent, the command queuing state is canceled in step S11. If existent, step S11 is skipped to maintain the command queuing state. Then in step S12, presence of absence of a stop instruction is checked. In the absence thereof, the process returns to step S2 to wait for the next command interruption. If a command interruption is not determined in step S2, the processing of waiting for occurrence of a command end interruption is repeated in step S8. On the other hand, if the command from the host 11 as checked in step S3 is not covered by queuing, it is checked whether or not the process is in command queuing state in step S3. When command queuing state is not set, command processing of the command received in step S14 is executed in the background. When completion of command execution is determined in step S15, the command processing completion is reported to the host in step S16. When the process is in the command queuing state in step S13, on the other hand, the process advances to step S17 to check whether or not the received command is the emergency evacuation command. If it is the emergency evacuation command, the process advances to step S18 to execute emergency evacuation processing. Details of the emergency evacuation processing will be described later. If the command is not the emergency evacuation command in step S17, which corresponds to a case where a command other than the command to be queued in the command queuing state is received. A protocol error is prepared and reported to the host in step S19, and in step S20, the command queuing state is canceled. Along with this cancellation of the command queuing state, all the queuing information then stored in the command queue 50 is canceled so as to permit retry by the host 11.

Figure 4:
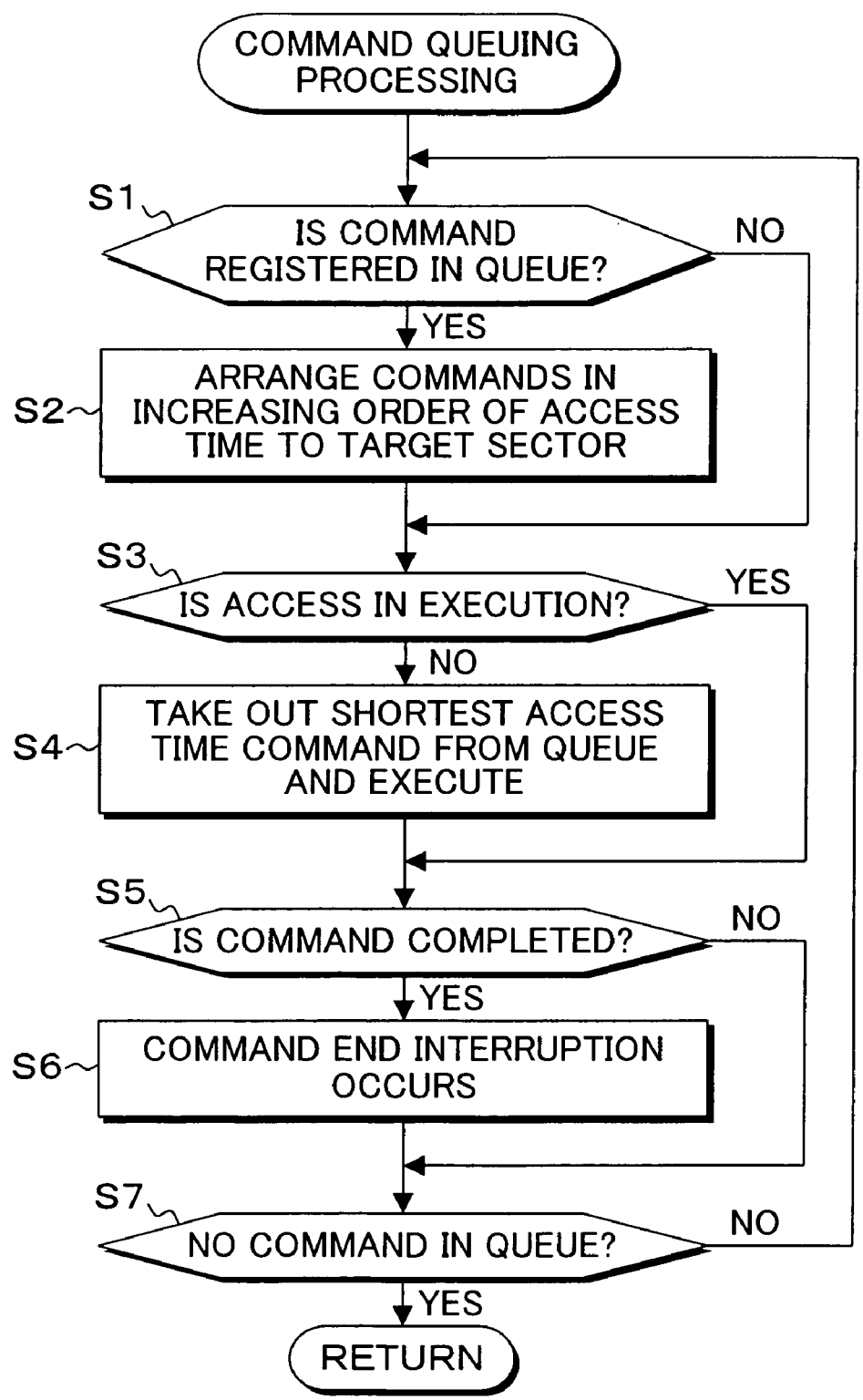
FIG. 4 is a flowchart of command queuing processing executed in the background in step S7 shown in FIG. 3.

FIG. 4 is a flowchart illustrating the command queuing processing executed in the background of step S7 as shown in FIG. 3, i.e., the processing of the command queuing processing unit 46 provided in the MPU 26 shown in FIGS. 1A and 1B. The command queuing processing shown in FIG. 4 comprises the steps of checking, after storing input/output commands newly received into the command queue 50, whether or not there is a preceding command registration in the command queue 50, and when there are command registrations, performing reordering by arranging the commands in the decreasing order of the access time to the target sector in step S2. Then in step S3, it is checked whether or not access is in execution, and if not in execution, the command having the shortest access time is taken out from the command queue 50 for execution in step S4. Then in step S5, it is checked whether or not the command is completed. If command completion is determined, a command end interruption is caused in step S6. Then in step S7, presence of a command in queue is checked. If there is a command, the process returns to step S1 to continue command queuing processing, i.e., to continue the command queuing state, and if there is no command in the command queue 50, the command queuing processing comes to an end. This means that the command queuing state is canceled.

Figure 5:
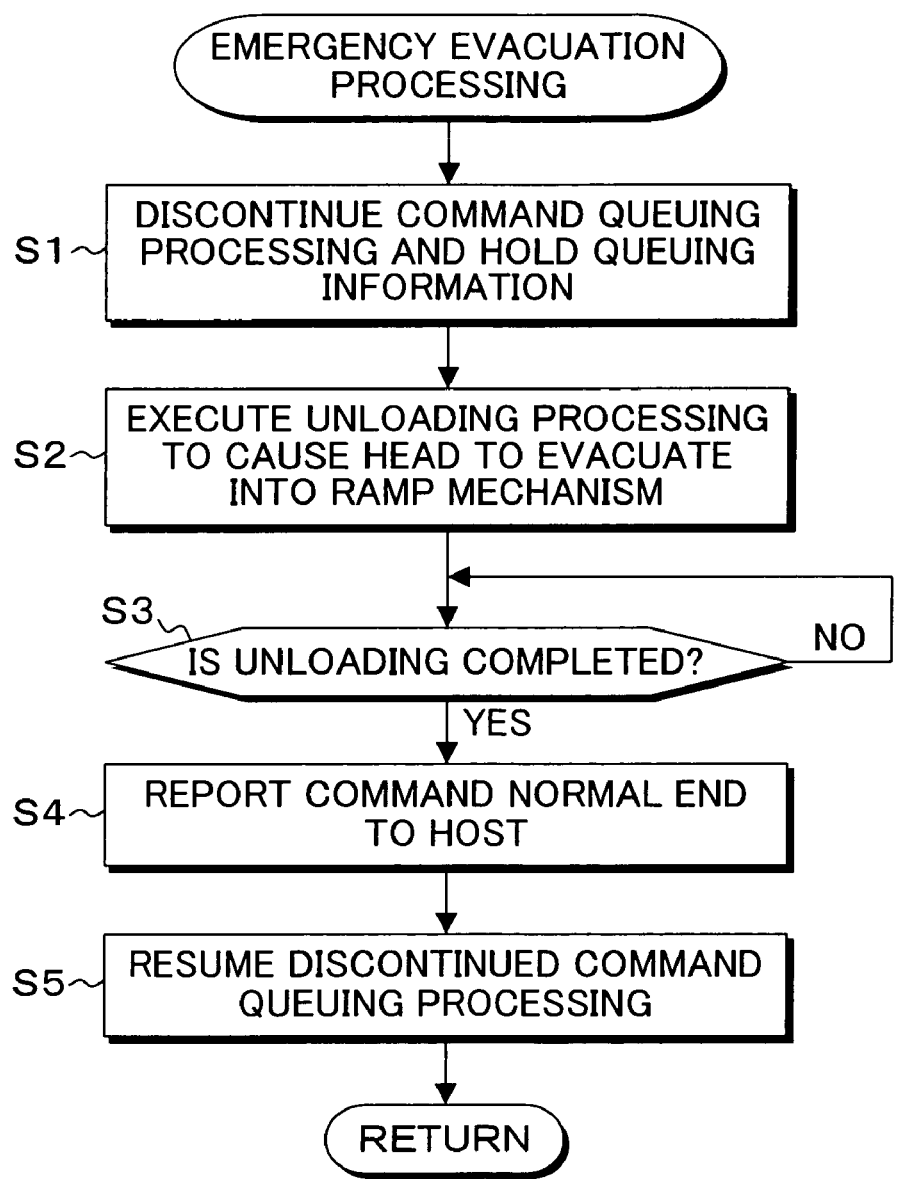
FIG. 5 is a flowchart illustrating an embodiment of emergency evacuation processing in step S18 shown in FIG. 3.

FIG. 5 is a flowchart of the emergency evacuation processing in step S18 shown in FIG. 3. This processing is carried out when the queuing state (1) above is temporarily discontinued, and thus resumed after execution of the emergency evacuation command as a control function thereof. In FIG. 5, in the emergency evacuation processing, the command queuing processing in execution in the background in step S1 is interrupted to hold the queuing information, and then in step S2, an unloading processing is executed so as to cause the head to evacuate into the ramp mechanism. Then in step S3, it is checked whether or not the unloading has been completed. If completion of unloading is determined, normal end of command is reported to the host in step S4, and then in step S5, the command queuing processing in interruption is resumed.

Figure 6:
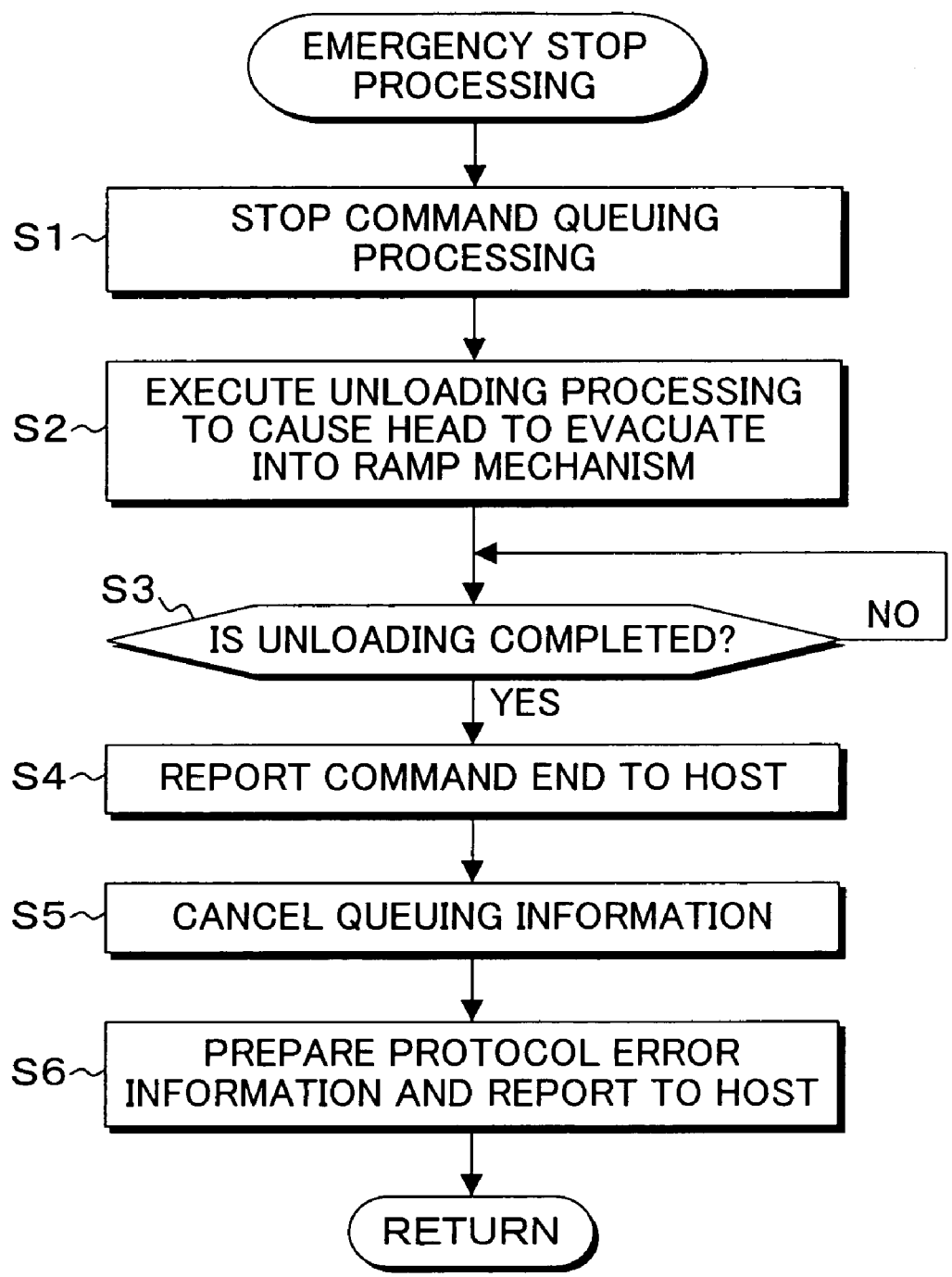
FIG. 6 is a flowchart illustrating another embodiment of emergency evacuation processing in step S18 shown in FIG. 3.

FIG. 6 is a flowchart of another embodiment of the emergency evacuation processing in step S18 shown in FIG. 3. In this embodiment, the queuing state is canceled upon execution of the emergency evacuation command performed by the control function (2) above, and a protocol error is prepared. In FIG. 6, the emergency evacuation processing comprises, after discontinuing the command queuing processing in execution in the background in step S1, executing an unloading processing by evacuating the head into the ramp mechanism in step S2. Then, when unloading completion is determined in step S3, normal end of the emergency evacuation command is reported to the host in step S4, and in step S5, the queuing information is canceled. Then in step S6, a protocol error is prepared and reported to the host 11.

The above-mentioned embodiments have covered cases adopting a serial ATA as an interface between the host 11 and the storage device providing the command queuing function. The present invention is also directly applicable for a case using the command queuing function of SCSI known as the same serial transfer interface. In the above-mentioned embodiments, the magnetic disk apparatus has been adopted as a storage device. The present invention is applicable as it is to an appropriate storage device so as far it has a structure in which the head is movable by an actuator relative to the medium. The present invention includes appropriate variations without impairing the object and advantages, and is not limited by numerical values shown in the above-mentioned embodiments.

What is claimed is:

1. A storage device having a ramp mechanism which shakes out a head onto a medium and holds said head by causing said head to evacuate from the medium, comprising:
   a command queuing processing unit which, after storing input/output commands in the order of command issuance by a host in accordance with a queuing protocol set forth in an interface having a command queuing function of connecting between the host and a storage device into a queue, executes the commands by arranging the commands in the increasing order of access time to the medium, and responds to the host with the command completion in the order of completion of execution; and
   an emergency evacuation processing unit which, upon receipt of an emergency evacuation command not set forth in said queuing protocol from said host during operation of said command queuing processing unit, discontinues operation of said command queuing processing unit, processes the command information queuing in said command queuing processing unit, and causes said head to evacuate from the medium into said ramp mechanism;
   wherein the procedure for selecting in advance by means of said emergency evacuation processing unit is:
   a first procedure of holding the discontinuance state upon discontinuing the command execution of said command queuing processing unit, and upon the completion of said emergency evacuation command, and releases the discontinuance state of command execution of said command queuing processing unit to resume command execution; or
   a second procedure of destroying all the command information queuing in said command queuing processing unit upon the completion of execution of said emergency evacuation command.

2. The storage device according to claim 1, wherein said emergency evacuation processing unit notifies, upon completion of execution of said emergency evacuation command, said host of a normal end of the command.

3. The storage device according to claim 1, wherein said emergency evacuation processing unit notifies, upon the completion of execution of said emergency evacuation command, said host of the occurrence of a protocol error of queuing in said command queuing processing unit.

4. A control method of a storage device having a ramp mechanism which shakes out a head onto a medium and holds said head by causing said head to evacuate from the medium, comprising:
   a command queuing processing step which, after storing input/output commands in the order of command issuance by a host in accordance with a queuing protocol set forth in an interface having a command queuing function of connecting between the host and a storage device into a queue, executes the commands by arranging the commands in the increasing order of access time to the medium, and responds to the host the command completion in the order of completion of execution; and
   an emergency evacuation processing step which, upon receipt of an emergency evacuation command not set forth in said queuing protocol from said host during operation of said command queuing processing unit, discontinues operation of said command queuing processing unit, processes the command information queuing in said command queuing processing unit, and causes said head to evacuate from the medium into said ramp mechanism;
   wherein the procedure for selecting in advance by means of said emergency evacuation processing unit is:
   a first procedure of holding the discontinuance state upon discontinuing the command execution of said command queuing processing unit, and upon the completion of said emergency evacuation command, and releases the discontinuance state of command execution of said command queuing processing unit to resume command execution; or
   a second procedure of destroying all the command information queuing in said command queuing processing unit upon the completion of execution of said emergency evacuation command.

5. The control method of a storage device according to claim 4, wherein said emergency evacuation processing step notifies, upon the completion of execution of said emergency evacuation command, said host of the normal end of the command.

6. The control method of a storage device according to claim 4, wherein said emergency evacuation processing step notifies, upon the completion of execution of said emergency evacuation command, said host of the occurrence of a protocol error of queuing in said command queuing processing unit.

7. A computer-readable storage medium which stores a program a program which causes a computer of a storage device having a ramp mechanism which shakes out a head onto a medium and holds said head by causing said head to evacuate from the medium to execute:

a command queuing processing step which, after storing input/output commands in the order of command issuance by a host in accordance with a queuing protocol set forth in an interface having a command queuing function of connecting between the host and a storage device into a queue, executes the commands by arranging the commands in the increasing order of access time to the medium, and responds to the host with the command completion in the order of completion of execution; and an emergency evacuation processing step which, upon receipt of an emergency evacuation command not set forth in said queuing protocol from said host during operation of said command queuing processing unit, discontinues operation of said command queuing processing unit, processes the command information queuing in said command queuing processing unit, and causes said head to evacuate from the medium into said ramp mechanism;

wherein the procedure for selecting in advance by means of said emergency evacuation processing unit is:

a first procedure of holding the discontinuance state upon discontinuing the command execution of said command queuing processing unit, and upon the completion of said emergency evacuation commend, and releases the discontinuance state of command execution of said command queuing processing unit to resume command execution; or a second procedure of destroying all the command information queuing in said command queuing processing unit upon the completion of execution of said emergency evacuation command.

8. The storage medium according to claim 7, wherein said emergency evacuation processing step notifies, upon the completion of execution of said emergency evacuation command, said host of the normal end of the command.

9. The storage medium according to claim 7, wherein said emergency evacuation processing step notifies, upon the completion of execution of said emergency evacuation command, said host of the occurrence of a protocol error of queuing in said command queuing processing unit.

* * * * *